United States Patent

[11] 3,594,923

[72] Inventor Calvin P. Midgley
 R.F.D. #1, Lake Villa, Ill. 60046
[21] Appl. No. 791,943
[22] Filed Jan. 17, 1969
[45] Patented July 27, 1971

[54] CHEMISTRY-TEACHING AID
 11 Claims, 7 Drawing Figs.

[52] U.S. Cl.............................................. 35/18 R,
 35/73
[51] Int. Cl............................................... G09b 23/24
[50] Field of Search................................. 35/18, 60,
 73, 7.3

[56] References Cited
UNITED STATES PATENTS

| | | | | |
|---|---|---|---|---|
| 1,269,384 | 6/1918 | Campbell | | 35/60 |
| 1,385,356 | 7/1921 | Bates | | 35/73 X |
| 2,891,322 | 6/1959 | Brownlee | | 35/18 |
| 2,965,978 | 12/1960 | Olson | | 35/7.3 UX |
| 2,845,722 | 8/1958 | Midgley | | 35/18 |
| 3,423,093 | 1/1969 | Lahav | | 35/18 X |
| 3,497,967 | 3/1970 | Lewis | | 35/60 X |

FOREIGN PATENTS

26,389  1910  Great Britain................ 35/18

OTHER REFERENCES

TABLE OF PERIODIC PROPERTIES OF ELEMENTS copyright 1964 by E. H. Sargent & Co.

*Primary Examiner*—Harland S. Skogquist
*Attorney*—Hofgren, Wegner, Allen, Stellman and McCord

ABSTRACT: A chemistry-teaching aid for use in conjunction with the classroom demonstration of qualitative tests for the presence of selected elements in chemical substances, which includes a base member defining a periodic table or excerpts therefrom with a marked element space for each of a plurality of chemical substances which consists of or includes a selected element. A test index member, preferably a card, is provided for each of the selected elements which either matches the characteristic color produced in a laboratory test for the presence of the selected element in a compound, or indicates a precipitate by a vertical arrow, or both. Mounting means are provided on the base member in association with each of the element spaces for receiving the test index cards. Each card may have the chemical symbol for an element printed on one face.

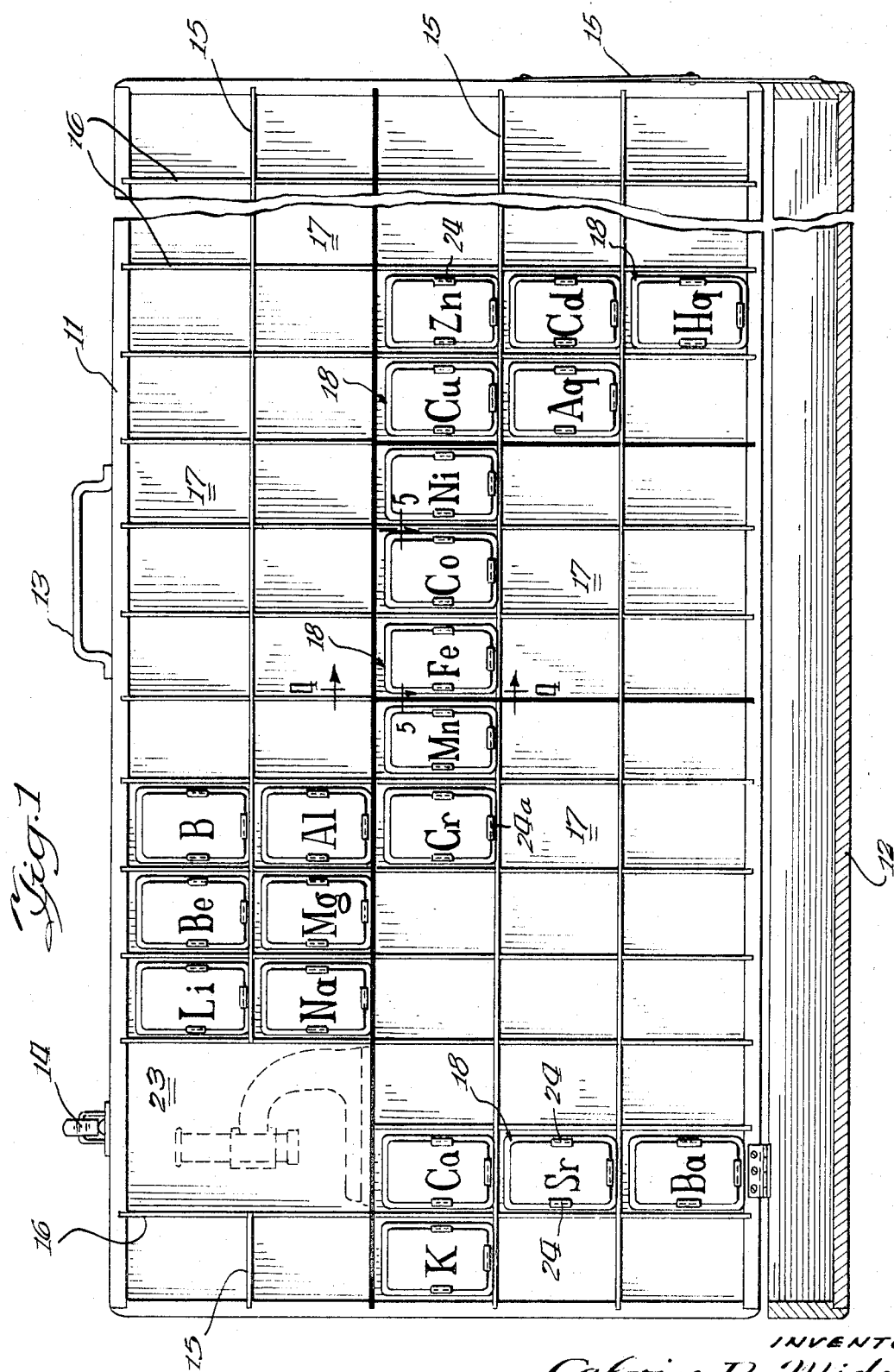

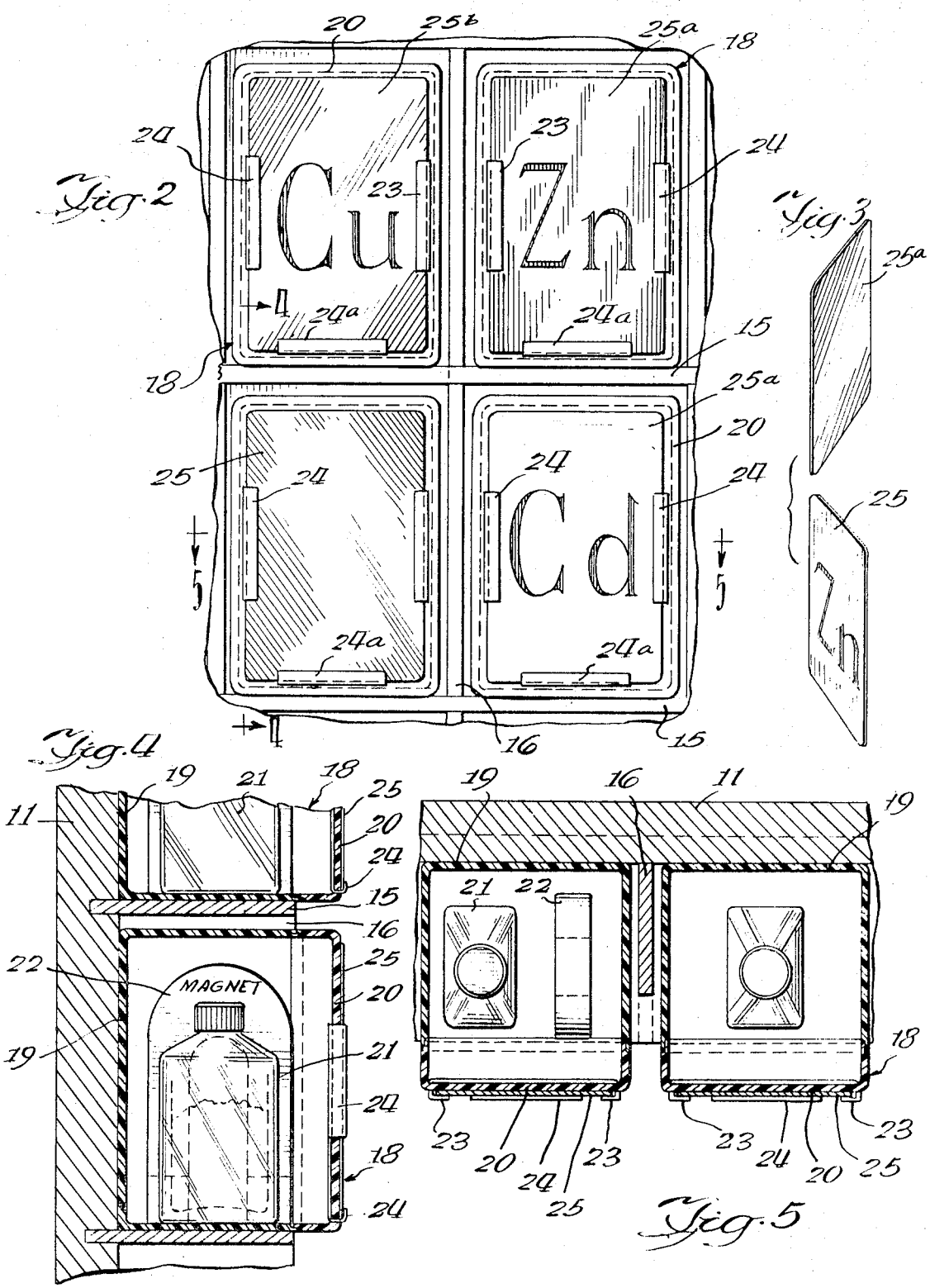

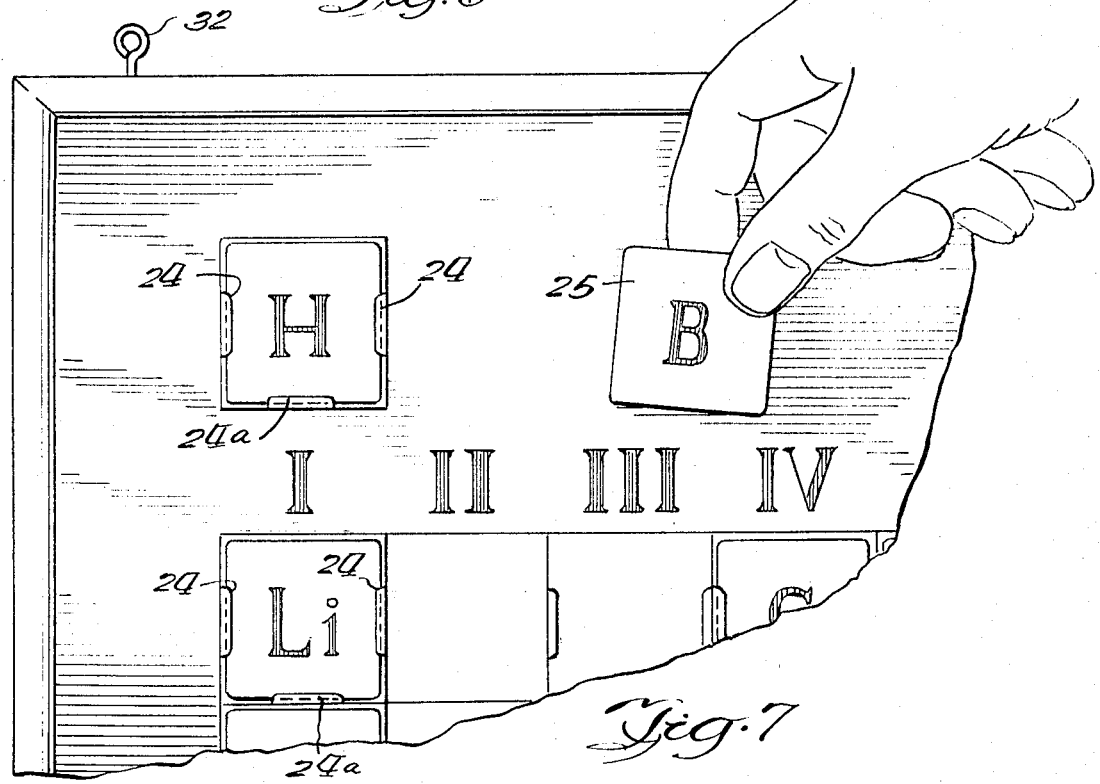

3,594,923

CHEMISTRY-TEACHING AID

BACKGROUND OF THE INVENTION

In my prior U.S. Pat. No. 2,845,722, entitled Testing Unit Providing A Teaching Aid For The Demonstration Of Chemistry Experiments To Students, I have disclosed a testing unit which serves as a teaching aid in the demonstration of chemistry experiments to students. That teaching aid is used by providing each student with a testing unit divided into element spaces for selected elements which will be discussed in a single portion of an elementary chemistry course. The arrangement of the element spaces coincides with the arrangement of the elements in a periodic table or modified table. Each element space receives a small storage vessel containing a supply of a compound of the element; and the compounds are used in the carrying out of qualitative analytical experiments on the compound. The testing unit also permits the carrying out of experiments on a compound in the place that the element of the compound occupies in the periodic table.

Such qualitative analytical experiments include bead tests, flame tests, precipitation tests, and the like, in which the presence of a particular element in a compound is detected by the presence of its characteristic color and/or precipitate as brought out in the test. The present invention provides a teaching aid which may be used in conjunction with the aid shown in my previous patent, and by which the student may visualize on a periodic table the respective element colors and/or precipitates produced by the various tests as the experiments are carried out by the class. As is known, when all of the characteristic colors and precipitates of the elements are in their proper places on a periodic table, they form a definite pattern, the knowledge of which is helpful to the student.

SUMMARY OF THE INVENTION

This invention relates to a teaching aid for use in the demonstration of chemistry experiments to students, and in the carrying out of such experiments by the students.

The principal object of the invention is to provide a teaching aid of the character described which presents to chemistry students a visual aid in the form of index members using colors, arrows or both for each of a plurality of selected elements to indicate the characteristic result of a laboratory test when the element is present in a particular compound, and to relate the color or other result and the respective element to the position of the element in the periodic table.

The preferred form of the invention comprises a teacher's portable supply case having a plurality of cubicles corresponding in location to the positions in the periodic table of the selected elements. Each cubicle contains a box that holds a container of an element or a compound of the element, and also in the box is any other special equipment which is used in the laboratory experiments involving the particular element. The term "chemical substance" is used generically herein to include both elements and compounds. A test index card is provided for each of the selected elements which bears an index color or arrow or both, indicating what is produced in a laboratory test for the presence of the respective element in a chemical substance. Each box has means for removably receiving the test index card for the respective element. The term "test index member" is used herein to define a member (conveniently a card) which bears a color that matches the color produced in a particular laboratory test for the presence of an element, or an arrow to indicate a precipitate, or both arrow and color.

The test index cards may also be employed in conjunction with a wall chart-type periodic table, as a visual teaching aid in a classroom.

Other objects, features and advantages of the invention will be apparent from the following detailed description taken in conjunction with the accompanying drawings.

DESCRIPTION OF THE DRAWINGS

FIG. 1 is a front elevational view, partly in section, of a teaching aid constructed in accordance with the invention;

FIG. 2 is an elevational view, on an enlarged scale, of a portion of the teaching aid shown in FIG. 1;

FIG. 3 is a perspective view of a pair of the reversible colored cards utilized with the invention;

FIG. 4 is a fragmentary section on an enlarged scale taken as indicated along the line 4—4 of FIG. 1;

FIG. 5 is a fragmentary section on an enlarged scale taken as indicated along the line 5—5 of FIG. 1;

FIG. 6 is an elevational view of a wall chart embodying the invention; and

FIG. 7 is a fragmentary elevational view of the upper left-hand corner of the form of the invention shown in FIG. 6.

DETAILED DESCRIPTION OF THE INVENTION

Referring to the drawings in greater detail, and referring first to FIGS. 1 to 5, a teaching aid is provided with a base member 11 and a hinged closure 12, the base member having a handle 13, and the base member and the closure being provided with fasteners 14 and a folding brace 15 for the closure; so that the testing unit may serve as a carrying case or may be positioned with the base member 11 in an upright position and the closure 12 horizontal so that the interior of the base member may be seen by the students when a teacher uses the device for a classroom demonstration.

The base member 11 is divided by a plurality of horizontal and vertical partitions 15 and 16, respectively, into a plurality of cubicles or "pigeon holes" 17 for receiving small boxes, generally designated 18. Each box has a base 19 and a lid 20 (FIGS. 4 and 5) and is of a size to fit easily into a cubicle 17 of the base member 11. The boxes are large enough to hold a container 21 of a chemical substance, and also may contain miscellaneous small equipment which is used with a respective element. For instance, referring to FIG. 4 and assuming that the box is for the element iron, it may contain a bottle 21 filled with iron filings, and may also contain a magnet 22. The box and its chemical substance constituting or containing a particular element is in a cubicle 17 at a position in the base member 11 which coincides with the position of the element in the periodic table.

Normally, only the elements used and experimented with in a particular course need have separate boxes for containing the chemical substance or apparatus. The remaining cubicles 17 are used for storage of other materials not especially related in use to the specific element. The partitions 15 and 16 may be arranged so as to provide large cubicles (for instance cubicle 23 in FIG. 1) for receiving apparatus such as a microscope which is too large to fit in a cubicle 17.

To removably receive test index members in the form of cards 25, or element identification cards 25a, or combined test index and element identification cards 25b, the lid 20 of each box 18 is provided with a flanged guide 24 along each side edge of the lid and a third flanged guide 24a along the bottom edge of the lid. The flanged guides 24 and 24a form an open front pocket for receiving such cards. The cards 25a are solely identification cards which bear the chemical symbols of the elements contained in the respective boxes. The cards 25 are test index cards, each of which matches the characteristic color produced in a laboratory test for the presence of the respective element in a compound, or bears an arrow showing formations of a precipitate, or both. The cards 25b combine the chemical symbol with the test index. The cards may be used in various ways. For instance, an element identification card 25a may be positioned within the flanged guides 24 and 24a and selectively covered with a test index card 25 to conceal the identifying symbol of the element. Alternatively, a card may combine two functions by being of a test color and having a corresponding chemical symbol on only one face; so that a first face is a 25 card and a second face is a 25b card.

Yet another alternative is a card which is white on one face and bears a chemical symbol so that face is a 25a card, and which has the other face in a test color to be a 25 card. A precipitate arrow may be on the same face with a chemical symbol or on the opposite face.

Still other uses for the test index cards are contemplated by this invention. For instance, the cards may carry the formula of the chemical compound which is produced in a test for a particular element. Thus, for example, the test for the presence of silver in an unknown salt may be the use of a reagent such as hydrochloric acid which produces a white precipitate of silver chloride. The card for the silver precipitate would, therefore, bear the chemical symbol for silver chloride (AgCl) and an arrow. In certain precipitation tests, if a particular reagent is used and nothing happens, the student knows that the particular element is present in the tested compound. In such a case, the test index card could simply carry a horizontal line or other suitable symbol.

The use of the boxes 18 with the cards received on the lid portions thereof is but a preferred form of the invention. Test index strips may be located on the base member at or adjacent to each of the element positions to indicate the characteristic indicator of the material produced in the test.

As stated above, only the elements or compounds used and experimented with in a particular course need have separate boxes for containing the chemical substance or apparatus. The remainder of the cubicles 17 are left open, as with the cubicle 23 in FIG. 1. Cardboard or other sheet members may be provided to cover one or more of the cubicles 17 or a plurality of large areas may be left open like the area 23 and covered by the sheet members. The sheet members may be printed with one or more chemical symbols of the elements that would fit into the area covered by the card. The cards are removable, as are the test index cards, and thus serve as closures for the openings, permitting storage of various articles behind them.

Referring to FIGS. 6 and 7, and utilizing the same numerals as above where applicable, the invention is shown in the form of a wall chart periodic table, generally designated 30. The chart shown in FIGS. 6 and 7 embodies a modified, simplified periodic table which has been used in chemistry courses for grade school and lower high school students. Of course, the same arrangement can be used with a standard periodic table. The chart may be hung on the wall of a classroom for the visual aid of the teacher and students in carrying out qualitative analytical experiments on compounds. The chart has a base member 31 with means 32 for hanging the chart on a wall. The chart is provided with flanged guides 24 and 24a which receive cards 25 or 25a or 25b, such as those described above, and for the same purposes as the cards utilized in conjunction with the form of the invention shown in FIGS. 1 to 5.

The foregoing detailed description is given for clearness of understanding only and no unnecessary limitations should be understood therefrom, as modifications will be obvious to those skilled in the art.

I claim:

1. A chemistry-teaching aid for use in conjunction with the classroom demonstration of qualitative tests for the presence of selected elements in chemical substances, said teaching aid comprising in combination: a base member having a plurality of element spaces each of which is in a position on said base member which coincides with the position in the periodic table of one of said selected elements; identification means at each of said element spaces bearing the chemical symbol of the respective element for each element space; a plurality of test index members, there being at least one such member for each of said selected elements, and each such member bearing only index means that indicates the characteristic result produced in a laboratory test for the presence of said selected element in a chemical substance; and mounting means on said base member associated with each of said element spaces for removably mounting the test index member for the respective element at the element space for said respective element so as to selectively conceal or expose the chemical symbol at said element space.

2. The teaching aid of claim 1 wherein said base member has a substantially planar front face with said element spaces for selected elements marked thereon, and in which each of said test index members comprises a card of sheet material adapted to be removably supported by said mounting means on the base member.

3. The teaching aid of claim 2 wherein at least some of said cards have a chemical symbol for selected element printed on one face.

4. The teaching aid of claim 2 wherein said cards have the chemical symbols for the respective elements printed on one face and said characteristic index means at least on the other face.

5. The teaching aid of claim 1 wherein the index means comprises a color that matches the characteristic color produced in a laboratory test for the presence of a selected element in a chemical substance.

6. The teaching aid of claim 1 wherein the index means comprises an arrow indicating a precipitate.

7. The teaching aid of claim 1 wherein each of the element spaces comprises a storage cubicle, and in which there is a storage container in each cubicle, each said container being adapted to hold a supply of chemical substance.

8. The teaching aid of claim 7 in which there is a box in each cubicle in which the container is stored, and in which the mounting means are on the boxes.

9. The teaching aid of claim 8 in which each box is of sufficient size to hold auxiliary equipment which is used in conjunction with tests of the chemical substance stored in the box.

10. The teaching aid of claim 8 wherein each of said boxes has a flat front wall, in which the mounting means comprises a shallow open front pocket on said front wall, and in which the test index members are cards of sheet materials which are slidably received in said pockets.

11. The teaching aid of claim 8 wherein each box has a base and a lid, and the mounting means is on the lid.